Dec. 8, 1931. H. K. KOUYOUMJIAN 1,835,115
ELECTRIC CONTROLLING APPARATUS
Filed May 15, 1928

INVENTOR
Haroutiun K. Kouyoumjian
BY
Edwards, Sager + Bower
his ATTORNEYS

Patented Dec. 8, 1931

1,835,115

UNITED STATES PATENT OFFICE

HAROUTIUN K. KOUYOUMJIAN, OF PROVIDENCE, RHODE ISLAND, ASSIGNOR TO WARD LEONARD ELECTRIC COMPANY, A CORPORATION OF NEW YORK

ELECTRIC CONTROLLING APPARATUS

Application filed May 15, 1928. Serial No. 278,006.

This application relates to improved controlling apparatus and method of control for regulating the voltage of a direct current output and which is derived from an alternating current source, or alternating supply lines. The invention is particularly applicable to cases where a rectifier is used for converting the energy from alternating to direct current energy and to control of direct current power supplied to radio apparatus when the source of energy is alternating. The invention is applicable where any type of rectifier is used and especially where a full wave rectifier is used.

With reference to radio apparatus particularly, it is highly desirable to maintain a substantially constant voltage in the utilization of the transformed direct current energy regardless of change in the voltage of the alternating current supply and regardless of the direct current load.

The main object of this invention is not only to maintain substantially constant voltage, but to accomplish this by a simple form of apparatus which is economical in the amount of labor and material required and by utilization of apparatus of such construction that it serves to combine the functions of several separate devices heretofore required. Another important object is to produce an improved controlling apparatus of the above character which will have comparatively high efficiency as regards avoiding loss of energy in the controlling windings and in core losses. This saving in energy is mainly accomplished by the use of an improved apparatus which avoids the necessity of the use of several different and separate devices with separate windings and separate cores heretofore required.

Another advantage of this improvement is that it is capable of securing very close regulation of the voltage and likewise of securing the particular desired regulation to meet specil requirements. Other objects and advantages of this invention will be understood from the following description and accompanying drawings.

Figure 1:
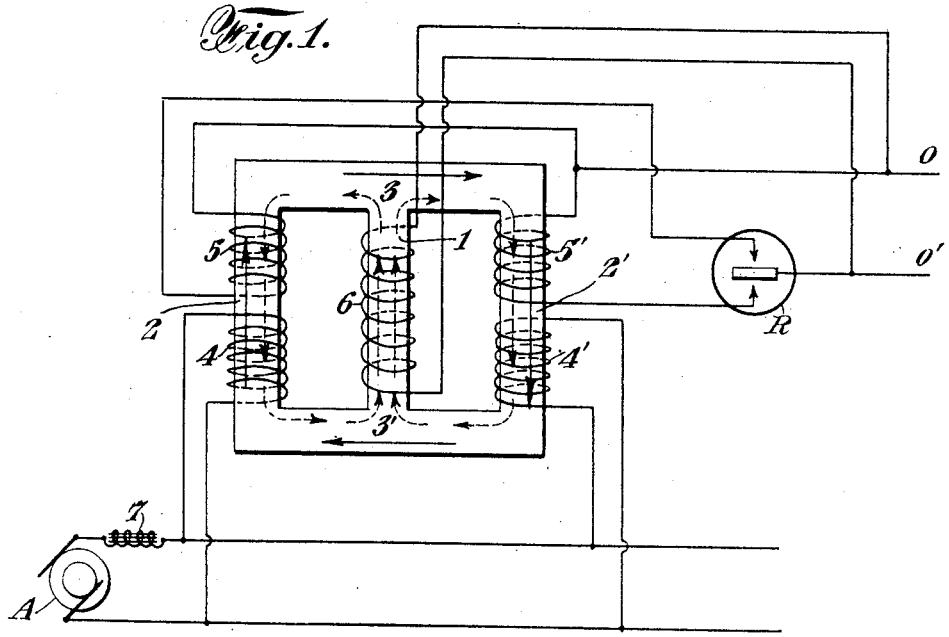
Figure 2:
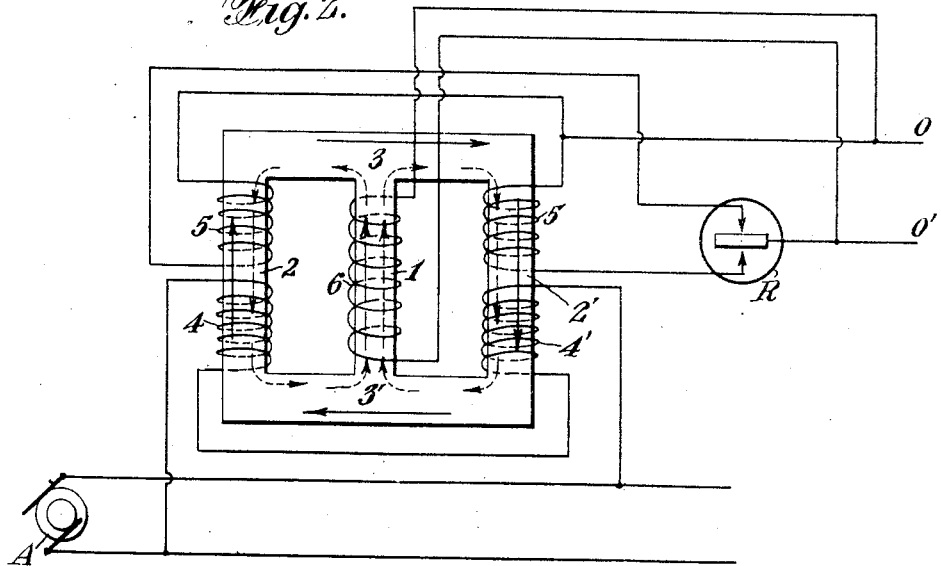

Fig. 1 is a diagram illustrating one embodiment of this invention; and Fig. 2 is another diagram illustrating another embodiment thereof.

In the particular form of the invention here exemplified, the same is shown applied to the case where a full wave rectifier R is used to supply current to direct current output lines O, O'; and where the energy is derived from an alternating current source A through static transforming means. Instead of using the customary form of transformer, however, the apparatus between the A. C. source and the rectifier serves not only as transforming means, but also as the regulating means and fulfills the functions of both.

In the form shown, the transforming and regulating apparatus comprises a laminated core having three legs joined together at the ends by cross-pieces; and this core carries the primary and secondary A. C. transformer windings and likewise a direct current controlling winding excited from the direct current output and properly related to the core and transformer windings. The three legs of the laminated core which are shown parallel to each other and in the same plane comprise a central leg 1 and the outer legs 2, 2', these legs being joined together by the end pieces 3, 3'.

The outer legs carry the primary and secondary transformer windings, the primary windings 4, 4' being indicated as connected in parallel with each to the alternating current supply lines; and the secondary windings 5, 5' are shown as connected in parallel with each other and connected at the intermediate connection to one of the direct current output lines O, the other two terminals of the secondary windings being connected to the rectifier R in the usual manner, the latter being in turn connected to the other direct current supply line O'.

Although the primary and secondary transformer windings are shown displaced from each other on the legs of the core, for simplicity and clearness, yet they would, of course, be preferably superimposed in accordance with usual transformer practise. Also, although the core is illustrated of the simplest form with the laminæ in planes parallel with each other, yet other forms of core may be used if desired, provided the functional relationship of the parts is maintained.

The central leg of the core is provided with a direct current winding 6 which is connected across the direct current output lines O, O'. A choke 7 is shown in Fig. 1 in series with one of the alternating current supply lines leading to the primary transformer windings. In very small transformers where the resistances of the primary windings 4, 4' are a major portion of their impedances, the choke 7 becomes unnecessary even where the primaries are connected in parallel with each other.

In the form shown in Fig. 2 the parts and connections are the same as in Fig. 1, except the primary transformer windings 4, 4' are connected in series with each other across the alternating current supply lines instead of in parallel. Here the choke 7 is not required, as the series connection of the primary transformer windings makes its use unnecessary under usual conditions, the total impedance of the windings serving to aid in maintaining close regulation.

In understanding the operation, it should be appreciated that the direct current winding 6 is always supplied with current from the direct current output wires and that the flux in the core resulting from the direct current excitation tends to pass in one direction, say upwardly through the middle leg 1, and divides and passes in the opposite direction, say downwardly through the two outer legs back to the central leg, as indicated by the dotted arrow lines. The excitation due to the transformer windings tends to pass through one of the outer legs, thence through one of the cross-pieces, then through the other outer leg and back through the other cross-piece to the first outer leg; and we may assume for a particular instant that the direction of the alternating current is such as to tend to cause the flux to pass upwardly through the left-hand leg 2 and through the cross-piece 3 downwardly through the right-hand leg 2' and then through the cross-piece 3' back to the leg 2, as indicated by the full arrow lines. The result is that the direct current excitation tends to increase the flux density in one of the outer legs and to reduce the flux density in the other, and for the particular instant and conditions above assumed, the downward passing of flux due to the A. C. current in the right-hand leg 2' will be increased by the flux due to the direct current excitation, whereas the upward passing flux in the left-hand leg 2 due to the alternating current will be decreased by the direct current excitation, the resultant flux in each of the outer legs depending upon the relative values and of course varying in accordance with the change in instantaneous values. When the alternating current wave reverses in direction from that above considered, the left-hand leg 2 will have its flux increased by the cumulative effect of the alternating current and direct current excitation; and the right-hand leg 2' will be subjected to the reverse condition.

The full wave rectifier takes energy or current first from one side or portion of the secondary windings of the transformer and then from the other side or portion and so continues to draw energy alternately from the two portions of the secondary windings. Where it is desired to maintain the voltage of the direct current output substantially constant, the portions of the secondary transformer windings and the rectifier should be in such relation that the rectifier takes energy from that portion of the secondary winding in which the direct current excitation of the combined controller and transformer and the excitation due to the alternating current are cumulative; and under the condition above assumed this would mean that the rectifier takes energy during the half wave considered from the secondary winding 5' on the right-hand leg. When the direction of alternating current changes in the next half wave, the rectifier will then take current from the secondary winding 5 which will then be subjected to the cumulative effect of direct and alternating excitation of the left-hand leg of the core.

For close voltage regulation, the core will be operated as regards flux density in a region at or near the knee of the saturation curve; and the change of flux density, as modified by change of current or ampere turns in the direct current winding on the core, will determine the regulation secured.

First, it may be assumed that the voltage of the alternating current supply lines increases beyond the normal amount. This results, unless counteracted, in increasing the voltage delivered to the rectifier from the portion of the secondary winding then supplying energy to the rectifier and likewise increasing the voltage of the direct current output.

However, any increase in voltage of the direct current output will increase the current or ampere turns in the direct current winding 6 and consequently increase the flux density in the leg of the core which is then being excited in the same direction by the primary alternating current winding. This brings the point of operation further up or around the knee of the saturation curve. Bringing the operation nearer or around the knee of the saturation curve causes decrease in the reactance; this decrease in the reactance allows more alternating current to be taken from the line, so that the change of flux due to this increase of current remains substantially the same or only increases slightly. Thus any increase in alternating current supply voltage is mainly counteracted by the controlling effect of the direct current winding 6. Similarly, when a decrease below normal occurs in the alternating current supply voltage, the flux density in the leg of the core carrying the then operative portion of the secondary winding is decreased and the range of operation is moved lower or down on the saturation curve. Due to the decrease in the input amperage, the change of flux remains substantially the same, or increases only slightly.

It will be understood that the proportions of the core and of the various windings as regards number of turns and resistance thereof will be made such in relation to each other as to secure the particular results desired as regards character of regulation. For example, the combined controller and transformer may be designed to operate at any desired region of the saturation curve depending upon the closeness of regulation required, the variations in the alternating current supply voltage and variations in direct current load which may be met in particular instances. Likewise, such factors as desired efficiency, size, weight and the like will affect the design.

Also, although operation with energy derived from the secondary portion of the winding on the cumulatively excited leg of the core has been particularly referred to for securing close regulation for the operation of radio apparatus and the like, yet in other cases it may be desired that the other portion of the secondary winding be utilized in delivering energy to the rectifier, in which case the reverse action from that above described occurs. This invention is thus capable of application to many different requirements and susceptible of modification to comply with particular conditions.

It is evident that this improved combined reactor and transformer results in the elimination of a number of different devices heretofore required, and that the regulation and transformation of energy is accomplished by a simple device which may be conveniently and economically manufactured.

Although a preferred embodiment of this invention has been illustrated and described, it will be understood that various modifications thereof may be made without departing from the scope of this invention.

I claim:

1. An alternating current source, means for converting energy derived therefrom to direct current energy, and transforming and regulating means comprising a core, said core having three connected portions and having a direct current winding excited from the converted direct current energy on one of said portions having a common relation to the other two portions, and having both a primary and a secondary winding on each of said other two portions.

2. An alternating current source, means for converting energy derived therefrom to direct current energy, and transforming and regulating means comprising a core, said core having three connected portions and having a direct current winding excited from the converted direct current energy on one of said portions and having both a primary and a secondary winding on each of the other two portions.

3. An alternating current source, means for converting energy derived therefrom to direct current energy, and transforming and regulating means comprising a core, said core having three legs connected together at their ends, a direct current winding subjected to the voltage of the direct current energy located on a central leg, and both a primary and a secondary transformer winding on each of the outer legs.

4. An electric controlling apparatus comprising a core having a plurality of legs, both a primary and a secondary transformer winding on each of two of said legs and a direct current winding on another of said legs, the magnetic flux due to said direct current winding acting cumulatively with reference to the flux of said transformer windings on one of said legs and in opposition to the flux of the transformer windings on the other of said legs, and means for converting alternating current energy derived from said transformer windings to direct current energy, said means supplying energy to said direct current winding.

5. An electric controlling apparatus comprising a core having three legs, both a primary and a secondary transformer winding on each of two of said legs, and a direct current voltage winding on the third leg, the magnetic flux due to said voltage winding tending to act cumulatively with the flux of the transformer windings on one of said legs and in opposition to the flux of the transformer windings on the other of said legs, and a rectifier connected to said secondaries, said rectifier supplying energy to said direct current winding.

6. An alternating current source, means for transforming and regulating the energy derived from said source, said means comprising a core, a primary and a secondary transformer winding on one portion of said core, a primary and a secondary winding on another portion of said core, a direct current winding on another portion of said core, the magnetic flux due to said direct current winding tending to act cumulatively with the flux of said transformer windings on one portion of said core and in opposition to the flux of said transformer windings on another portion of said core, and means for deriving direct current energy from the transformer windings at the time when the magnetic flux of the direct current winding is acting cumulatively with the flux thereof, said last named means supplying direct current energy to said direct current winding.

7. An alternating current source, means for transforming and regulating the energy derived from said source, said means comprising a core, a primary and a secondary transformer winding on one portion of said core, a primary and a secondary winding on another portion of said core, a direct current winding on another portion of said core, the magnetic flux due to said direct current winding tending to act cumulatively with the flux of said transformer windings on one portion of said core and in opposition to the flux of said transformer windings on another portion of said core, and means for deriving direct current energy from the transformer windings at the time when the magnetic flux of the direct current winding is acting cumulatively with the flux thereof, said direct current winding being subjected to the voltage of the converted direct current energy of said last named means.

HAROUTIUN K. KOUYOUMJIAN.